(12) United States Patent
Jun et al.

(10) Patent No.: US 11,942,615 B2
(45) Date of Patent: Mar. 26, 2024

(54) AIR-COOLED BATTERY COOLING SYSTEM FOR AIR MOBILITY VEHICLE

(71) Applicants: Hyundai Motor Company, Seoul (KR); Kia Corporation, Seoul (KR)

(72) Inventors: Hyun Woo Jun, Whasung-Si (KR); Woo Suk Jung, Whasung-Si (KR); Hee Kwang Lee, Whasung-Si (KR); Hyun Seok Hong, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 11 days.

(21) Appl. No.: 17/379,215

(22) Filed: Jul. 19, 2021

(65) Prior Publication Data
US 2022/0149456 A1     May 12, 2022

(30) Foreign Application Priority Data
Nov. 11, 2020 (KR) .................. 10-2020-0150233

(51) Int. Cl.
| | |
|---|---|
| *H01M 10/655* | (2014.01) |
| *H01M 10/613* | (2014.01) |
| *H01M 10/643* | (2014.01) |
| *H01M 10/653* | (2014.01) |
| *H01M 50/213* | (2021.01) |
| *H01M 50/249* | (2021.01) |

(52) U.S. Cl.
CPC ....... *H01M 10/655* (2015.04); *H01M 10/613* (2015.04); *H01M 10/643* (2015.04); *H01M 10/653* (2015.04); *H01M 50/213* (2021.01); *H01M 50/249* (2021.01); *H01M 2220/20* (2013.01)

(58) Field of Classification Search
CPC ............. H01M 10/625; H01M 50/249; H01M 2220/20
See application file for complete search history.

(56) References Cited

U.S. PATENT DOCUMENTS

| | | | |
|---|---|---|---|
| 8,114,536 B2 | 2/2012 | Kang et al. | |
| 8,367,239 B2 | 2/2013 | Hermann | |
| 10,669,037 B1* | 6/2020 | Kwon ............... | H01M 10/6562 |
| 2011/0135993 A1 | 6/2011 | An et al. | |
| 2018/0358671 A1* | 12/2018 | Halsey .............. | H01M 10/6557 |
| 2021/0083255 A1* | 3/2021 | Demont ............. | H01M 10/486 |

FOREIGN PATENT DOCUMENTS

KR         10-2186082 B1     11/2020

* cited by examiner

*Primary Examiner* — James Lee
(74) *Attorney, Agent, or Firm* — MORGAN, LEWIS & BOCKIUS LLP

(57) ABSTRACT

An air-cooled battery cooling system for an air mobility vehicle may ensure the cooling performance for batteries using air flows during the flight of the air mobility vehicle, since the cooling of the batteries is performed using an air flow in the top-bottom direction due to the hovering of the air mobility vehicle and an air flow in the front and rear direction due to the cruising of the air mobility vehicle, the efficient cooling performance for the batteries is ensured in a variety of flight modes. Furthermore, the batteries are securely fixed while being cooled by air flows via the heat transfer pads within the battery packs.

10 Claims, 4 Drawing Sheets

AIR-COOLED BATTERY COOLING SYSTEM FOR AIR MOBILITY VEHICLE

CROSS REFERENCE TO RELATED APPLICATION

The present application claims priority to Korean Patent Application No. 10-2020-0150233, filed Nov. 11, 2020, the entire contents of which is incorporated herein for all purposes by this reference.

BACKGROUND OF THE INVENTION

Field of the Invention

The present invention generally relates to an air-cooled battery cooling system for an air mobility vehicle, the battery cooling system ensuring battery cooling performance using an air flow during the flight of the air mobility vehicle.

Description of Related Art

Recently, the development of air mobility vehicles usable for a variety of purposes, such as freight transportation or medical transportation, has been underway. Air mobility vehicles are entering the stage of practical use, due to increased energy efficiency and reliability thereof.

Such air mobility vehicles may fly by operating propellers, which also enable takeoff and landing. In particular, recently, propellers of air mobility vehicles are configured to tilt depending on the flight mode such that the angles of propellers change depending on whether air mobility vehicles are hovering to vertically take off or land or cruising to fly forward thereof.

Since propellers are driven by the operation of motors, power for actuating motors may be provided, and correspondingly power is stored in a battery. Such a battery may have structural strength and cooling efficiency. When the battery is not efficiently cooled or is structurally unstable, the battery may have a danger of thermal runaway and a resultant fire.

This is directly related to the safety of air mobility vehicles, and there is a demand for a modular structure able to ensure the stability of a battery.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an air-cooled battery cooling system configured to ensure battery cooling performance using an air flow during the flight of the air mobility vehicle and stabilize batteries using a battery fixing structure.

In various aspects of the present invention, there is provided an air-cooled battery cooling system for an air mobility vehicle, the cooling system including: a base including a mounting space, extending in a longitudinal direction thereof, and having defined therein an air path through which an external air flows into the mounting space; and a battery pack mounted inside the mounting space of the base and including a plurality of batteries and a plurality of heat transfer panels fixing the batteries in the battery pack, wherein the heat transfer panels are spaced from each other to define air circulation paths therebetween such that air introduced through the air path of the mounting space cools the batteries while flowing through the air circulation paths.

The base may include first air paths extending through the mounting space from one end portion to the other end portion such that air flows therethrough and second air paths extending through the mounting space in a top-to-bottom direction or vice versa such that air flows therethrough.

The heat transfer panels may extend in the longitudinal direction of the base such that the plurality of batteries is disposed and fixed in the longitudinal direction thereof. The battery pack may be configured such that the plurality of heat transfer panels is spaced from each other in a lateral direction and the top-bottom direction of the base to define the air circulation paths through which air introduced through the first air paths and the second air paths circulates.

The base may include one-side inlet in one end portion thereof and the other-side outlet in the other end portion thereof, defining the first air paths extending through the mounting space from one side to the other side, and a filter removing impurities is provided in one-side inlet.

The base may include a top inlet provided above the mounting space and a bottom outlet provided below the mounting space, defining the second air paths extending through the mounting space in the top-to-bottom direction thereof, and a filter removing impurities is provided in the top inlet.

The air-cooled battery cooling system may further include a propeller provided on one end portion of the base and configured to tilt in a top-bottom direction thereof. The mounting space may be provided in one end portion of the base, such that, when the propeller operates, air circulates through the first air paths or the second air paths, depending on a tilting position of the propeller.

The battery pack may be a plurality of battery packs disposed on both side portions of the mounting space to be spaced from each other.

Each of the heat transfer panels may include a pair of pads defining therein a plurality of recessed receptacles in which the batteries are accommodated, respectively, the receptacles being spaced from each other by predetermined distances, such that, when the pads of the pair of pads are coupled to each other, the batteries are surrounded by the receptacles.

Each of the heat transfer panels may further include heat transfer pads provided on the receptacles of the pads, the heat transfer pads having high thermal conductivity such that when the pads of the pair of pads are coupled to each other, the heat transfer pads are located between the receptacles and the batteries.

The plurality of heat transfer panels may be spaced from each other in a lateral direction while being staggered in the longitudinal direction such that the receptacles in the heat transfer panels are staggered in a zig-zag pattern.

The heat transfer panels may be disposed such that the receptacles of each of the heat transfer panels are located between the receptacles of an adjacent one of the heat transfer panels.

The batteries may be cylindrically shaped and be disposed in a top-bottom direction by the pair of pads.

The air-cooled battery cooling system for an air mobility vehicle, having the above-described structure for cooling the batteries, ensures the cooling performance for the batteries using air flows during the flight of the air mobility vehicle, since the cooling of the batteries is performed using an air flow in the top-bottom direction due to the hovering of the air mobility vehicle and an air flow in the front and rear direction due to the cruising of the air mobility vehicle, the efficient cooling performance for the batteries is ensured in a variety of flight modes. Furthermore, the batteries are securely fixed while being cooled by air flows via the heat transfer pads within the battery packs.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
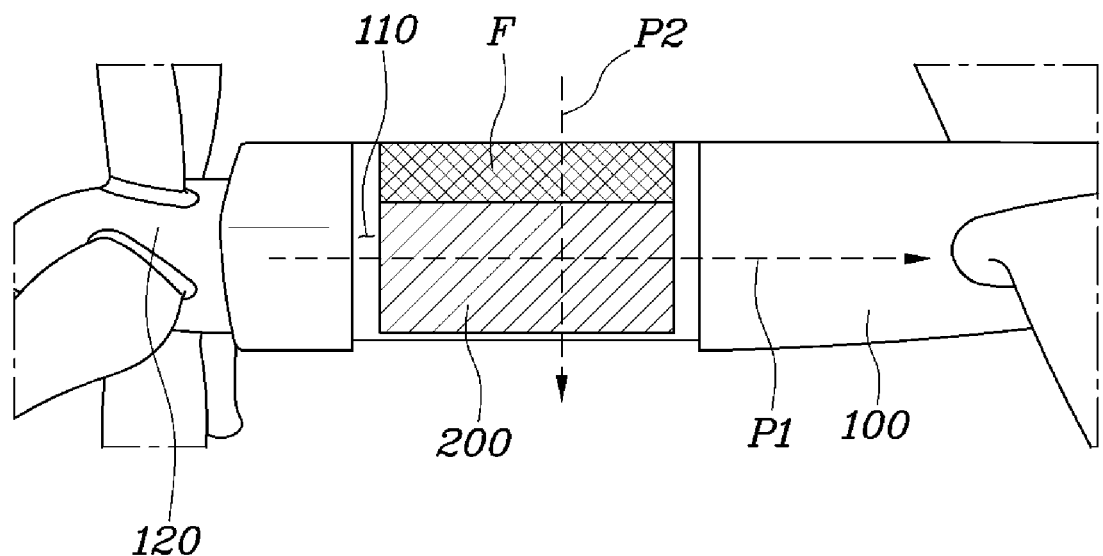
FIG. 1 and FIG. 2 are views exemplarily illustrating an air-cooled battery cooling system for an air mobility vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an air-cooled battery cooling system for an air mobility vehicle according to exemplary embodiments of the present invention will be described in detail with reference to the accompanying drawings.

Figure 2:
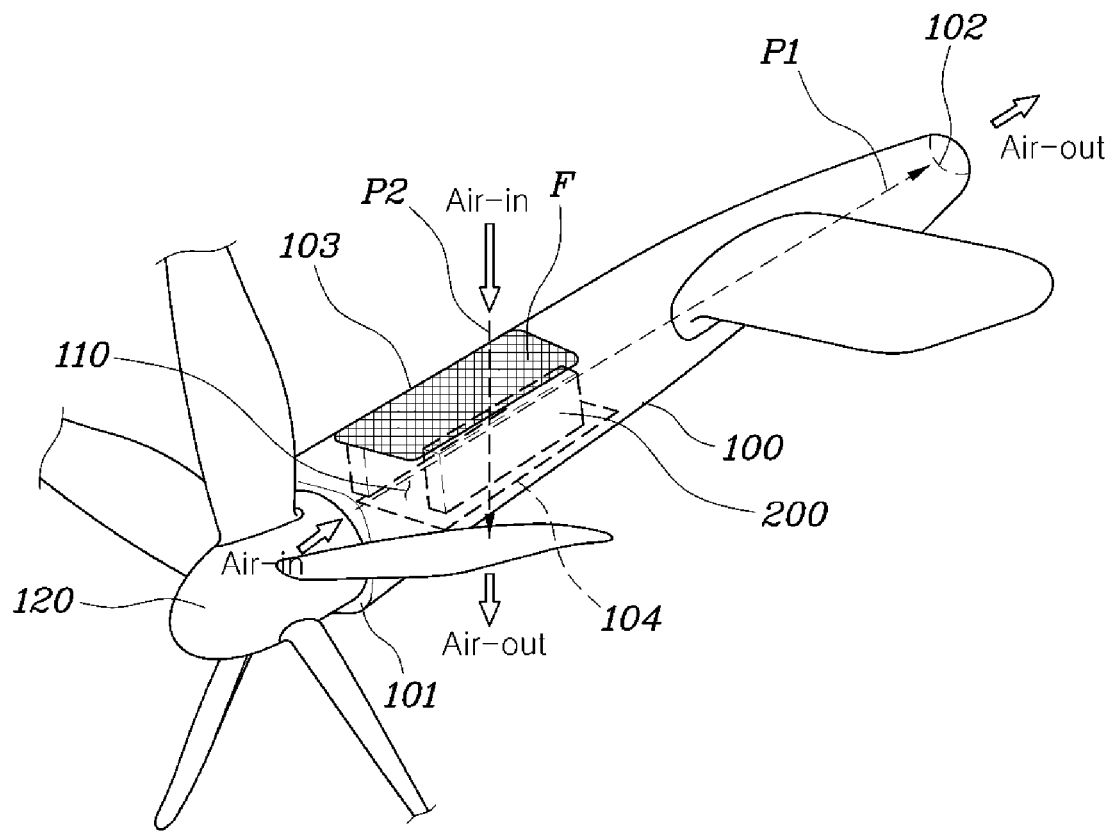
Figure 3:
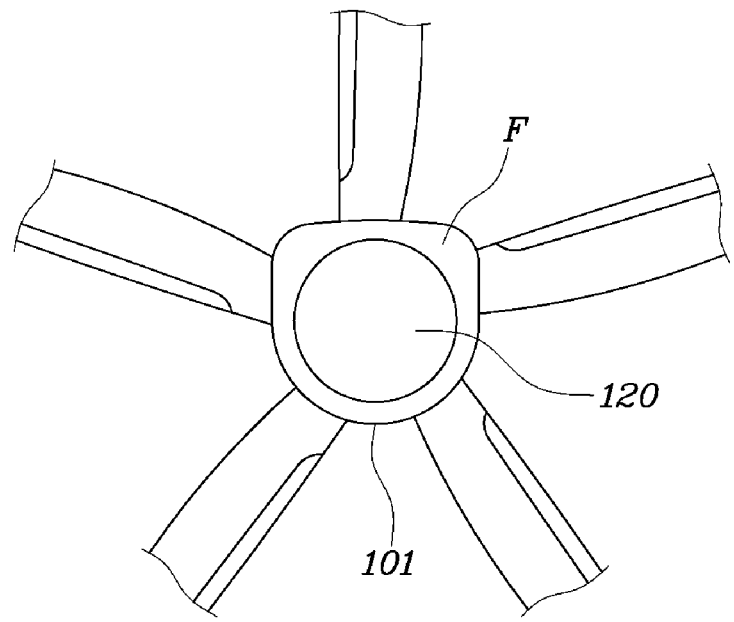
FIG. 3 is a front view of the air-cooled battery cooling system for an air mobility vehicle illustrated in FIG. 1.
Figure 4:
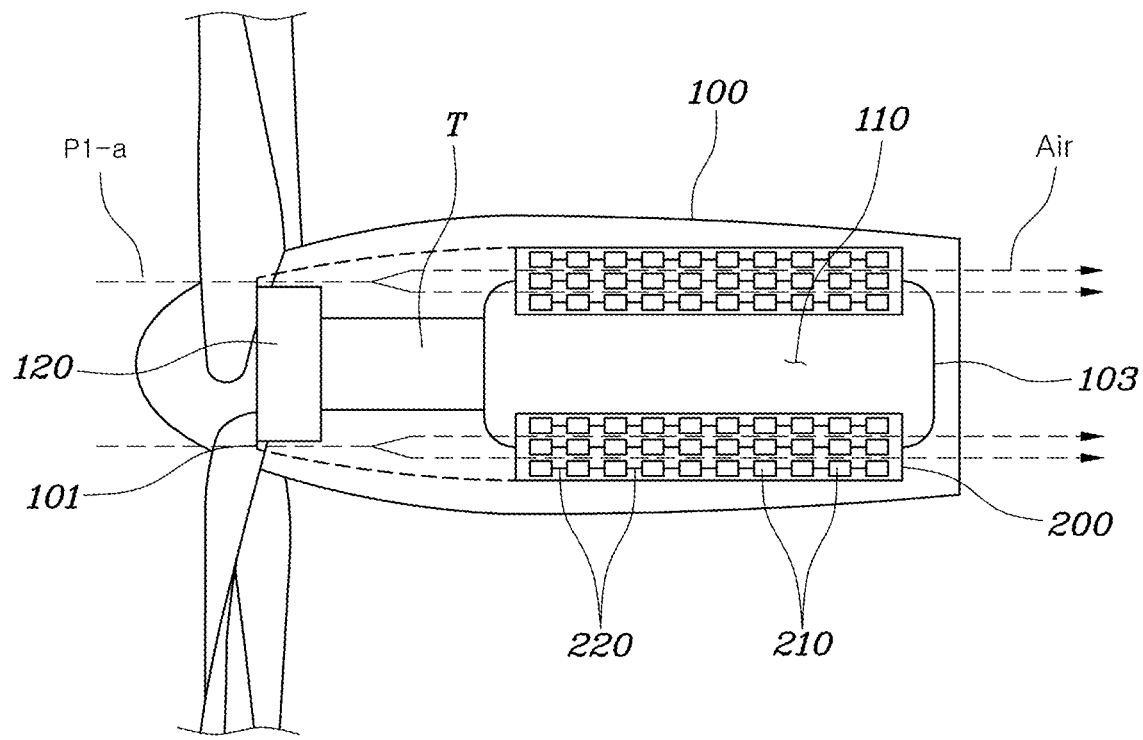
FIG. 4 and FIG. 5 are cross-sectional views of the air-cooled battery cooling system for an air mobility vehicle illustrated in FIG. 1.
Figure 5:
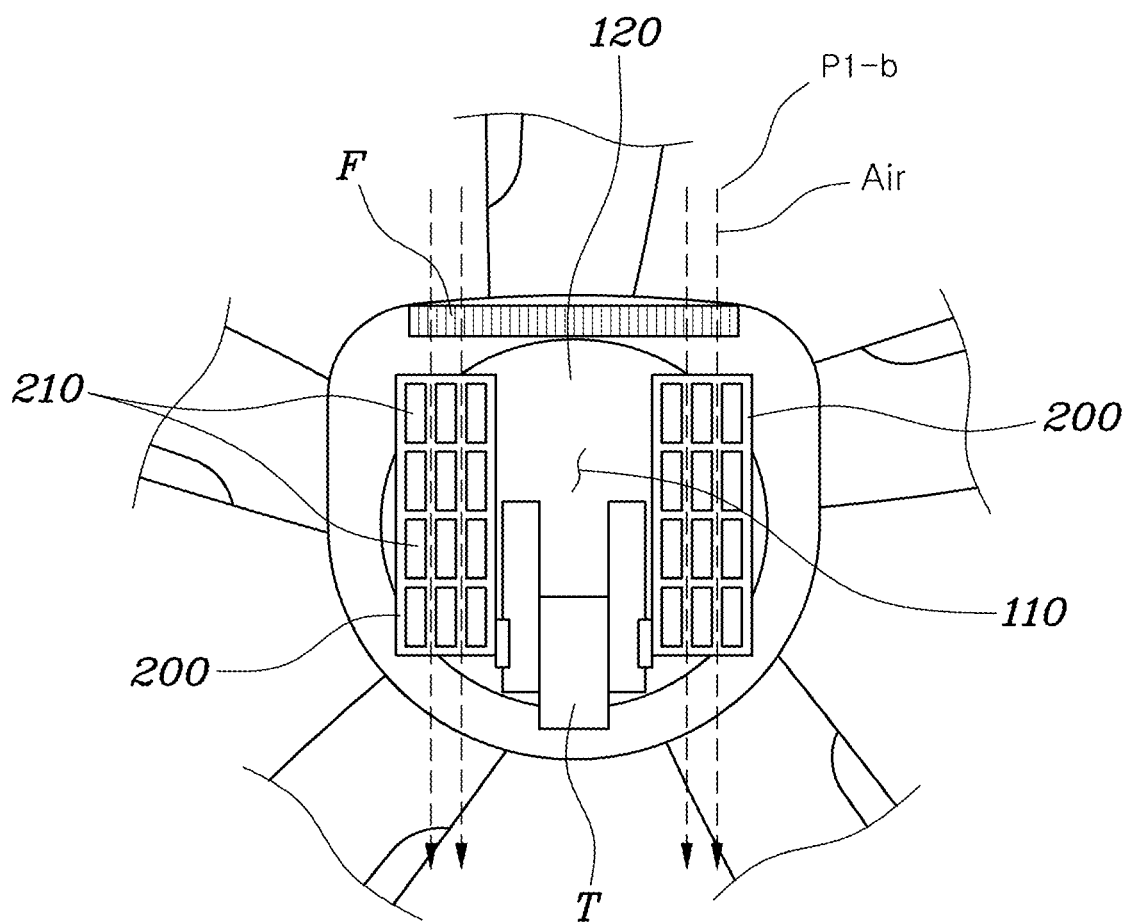
Figure 6:
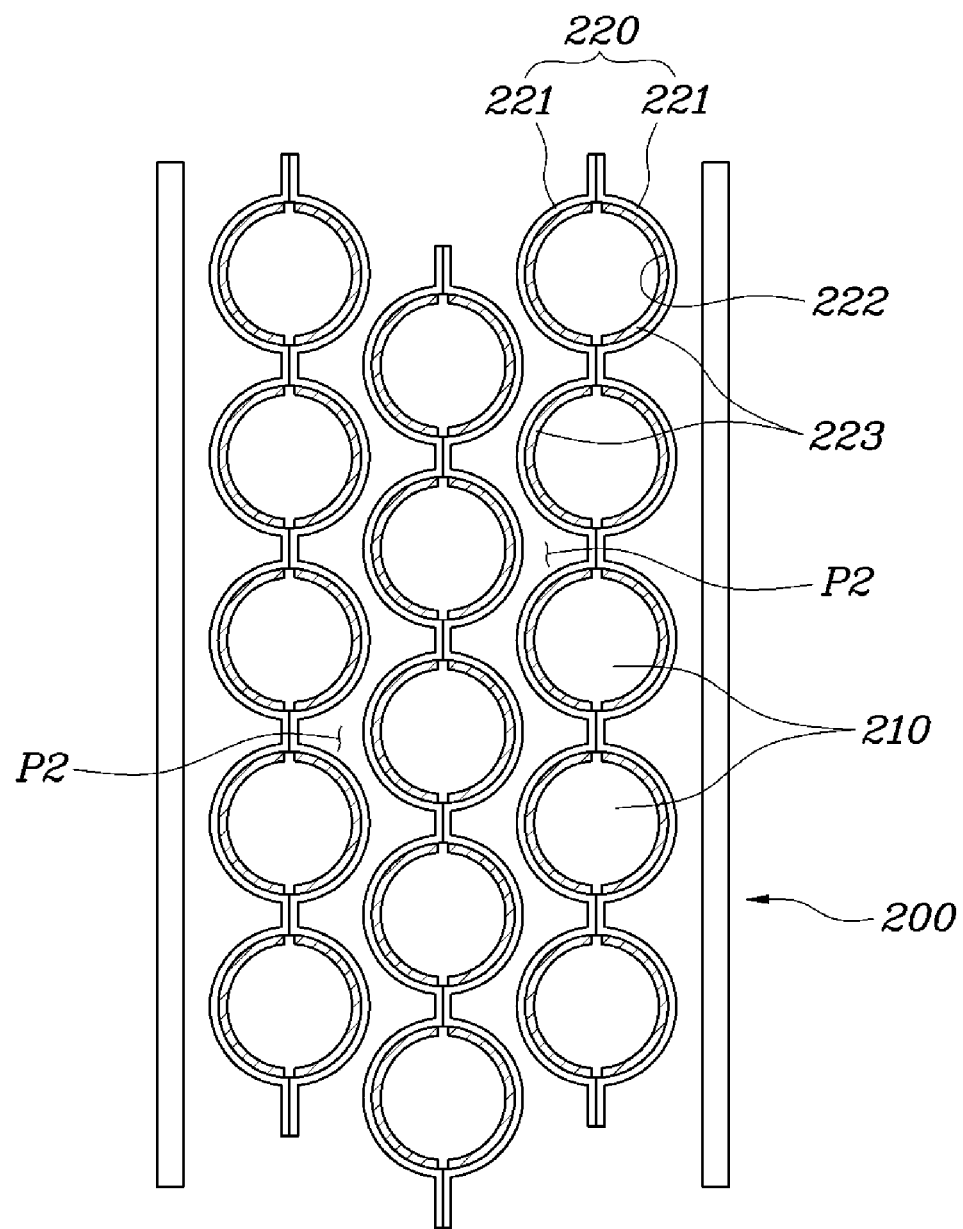
FIG. 6 is a view exemplarily illustrating the battery pack of the air-cooled battery cooling system for an air mobility vehicle.

FIG. 1 and FIG. 2 are views exemplarily illustrating an air-cooled battery cooling system for an air mobility vehicle according to various exemplary embodiments of the present invention, FIG. 3 is a front view of the air-cooled battery cooling system for an air mobility vehicle illustrated in FIG. 1, FIG. 4 and FIG. 5 are cross-sectional views of the air-cooled battery cooling system for an air mobility vehicle illustrated in FIG. 1, and FIG. 6 is a view exemplarily illustrating the battery pack of the air-cooled battery cooling system for an air mobility vehicle.

As illustrated in FIG. 1 and FIG. 2, the air-cooled battery cooling system for an air mobility vehicle according to various exemplary embodiments of the present invention may include a base 100 having a mounting space 110, extending in a longitudinal direction thereof, and having defined therein an air path P1 through which an external air flows to the mounting space 110; and a battery pack 200 disposed inside the mounting space 110 of the base 100 and including a plurality of batteries 210 and a plurality of heat transfer panels 220 fixing the batteries 210, wherein the heat transfer panels 220 are spaced from each other to define air circulation paths P2 therebetween such that air introduced through the air path P1 of the mounting space 110 cools the batteries 210 while flowing through the air circulation paths P2.

Here, the base 100 may be disposed in a wing of the air mobility vehicle or a boom extending from the wing. The air path P1 through which an external air flows to the mounting space 110 is formed in the base 100, and the battery pack 200 is provided in the mounting space 110 such that the batteries 210 of the battery pack 200 are cooled by the air passing through the air path P1.

The batteries 210 and the heat transfer panels 220 are provided in the battery pack 200, and the plurality of batteries 210 are fixed by the heat transfer panels 220. Here, the heat transfer panels 220 may be made of an aluminum alloy having high thermal conductivity and strength. Furthermore, the batteries 210 may be lithium (Li) ion batteries.

The plurality of batteries 210 are fixed to the plurality of heat transfer panels 220. The heat transfer panels 220 are spaced from each other such that the air circulation paths P2 are formed between the heat transfer panels 220. Thus, when the air mobility vehicle flies, air is introduced into the air path P1 extending through the mounting space 110 of the base 100. Accordingly, the introduced air performs heat exchange with the plurality of heat transfer panels 220 while flowing through the air circulation paths P2 within the battery pack 200. Consequently, the batteries 210 fixed to the heat transfer panels 220 are cooled due to the heat exchange with the air.

In the present manner, the present invention may perform cooling on the batteries 210 using air introduced during the flight of the air mobility vehicle. Here, the heat transfer panels 220 to which the batteries 210 are spaced from each other to define the air circulation paths P2 may provide smooth air flows, improving the cooling performance.

Describing the above-described features of the present invention in more detail, the base 100 includes first air paths P1-a extending through the mounting space 110 from one end portion to the other such that air flows therethrough and second air paths P1-b extending through the mounting space 110 in the top-to-bottom direction or vice versa such that air flows therethrough.

As described in FIG. 4 and FIG. 5, the base 100 has the first air paths P1-a extending through the mounting space 110 in the longitudinal direction and the second air paths P1-b open in the top-bottom direction of the mounting space 110. Here, since the first air paths P1-a are configured to be open in the forward-backward direction of the mounting space 110, air is introduced into the first air paths P1-a from the front of the air mobility vehicle when the air mobility vehicle flies forward in a cruising mode. Furthermore, since the second air paths P1-b are open in the top-bottom direction of the mounting space 110, air is introduced into the second air paths P1-*b* from above or below the air mobility vehicle when the air mobility vehicle vertically flies in a hovering mode.

In the present manner, the base 100 has the first air paths P1-*a* and the second air paths P1-*b* such that air may circulate in both the forward-backward direction and the top-bottom direction thereof, so that the battery pack 200 may be cooled in a variety of flying directions.

Here, since the heat transfer panels 220 extend in the longitudinal direction of the base 100, the plurality of batteries 210 are disposed and fixed in the longitudinal direction thereof. The battery pack 200 is configured such that the plurality of heat transfer panels 220 are spaced from each other in the lateral direction and the top-bottom direction to define the air circulation paths P2 through which air introduced through the first air paths P1-*a* and the second air paths P1-*b* circulates.

As illustrated in FIG. 6, the plurality of heat transfer panels 220 extend in the longitudinal direction of the base 100 and are spaced from each other in the lateral direction thereof, defining the air circulation paths P2 between the heat transfer panels 220. In FIG. 6, the forward-backward direction is the direction in which the drawing paper is viewed, while the lateral direction is the right-left direction thereof. Thus, air introduced through the first air paths P1-*a* of the base 100 may exchange heat with the heat transfer panels 220 while flowing in the forward-backward direction through the air circulation paths P2 between the heat transfer panels 220, cooling the batteries 210. Furthermore, the air circulation paths P2 formed by the plurality of heat transfer panels 220 may allow air to flow in the top-bottom direction thereof, since the plurality of heat transfer panels 220 are spaced from each other in the lateral direction thereof. Thus, the air introduced through the second air paths P1-*b* of the base 100 may exchange heat with the heat transfer panels 220 while flowing in the top-bottom direction through the air circulation paths P2 between the heat transfer panels 220, cooling the batteries 210.

As described above, the plurality of heat transfer panels 220 of the battery pack 200 are spaced from each other in the lateral direction and arrayed in the top-bottom direction such that the batteries 210 may be efficiently cooled by the air introduced through the first air paths P1-*a* and the second air paths P1-*b*. That is, as illustrated in FIG. 4, the air introduced from the front of the base 100 cools the batteries 210 while flowing from one side to the other side through the air circulation paths P2 between the heat transfer panels 220. Furthermore, as illustrated in FIG. 5, the air introduced in the top portion to bottom direction of the base 100 cools the batteries 210 while flowing from the top portion to the bottom through the air circulation paths P2 between the heat transfer panels 220.

Furthermore, the base 100 has one-side inlet 101 in one end portion thereof and the other-side outlet 102 in the other end portion thereof, defining the first air paths P1-*a* extending through the mounting space 110 from one side to the other side thereof. A filter F removing impurities may be provided in one-side inlet 101.

That is, one-side inlet 101 provided in one end portion of the base 100 allows air to be introduced therethrough from the front of the air mobility vehicle, and the other-side outlet 102 provided in the other end portion of the base 100 allows air that has flowed through the mounting space 110 to be discharged therethrough. Here, one-side inlet 101 may be provided in one end portion of the base 100, and the filter F preventing the entrance of impurities is provided in one-side inlet 101 to remove impurities in the air introduced from the front. The other-side outlet 102 may be provided in the other end portion of the base 100, with the size and position thereof being determined such that the air that has flowed through the first air paths P1-*a* to be efficiently discharged therethrough. Here, the filter F is not provided in the other-side outlet 102, since the other-side outlet 102 is not a component through which an external air is introduced, or the filter F may be provided in the other-side outlet 102.

Furthermore, the base 100 has a top inlet 103 provided above the mounting space 110 and a bottom outlet 104 provided below the mounting space 110, defining the second air paths P1-*b* extending through the mounting space 110 in the top-to-bottom direction thereof. A filter F removing impurities may be provided in the top inlet 103.

That is, the base 100 may have the top inlet 103 provided above the mounting space 110 such that air may be introduced therethrough from above the air mobility vehicle and the bottom outlet 104 provided below the mounting space 110 such that the air that has flowed through the mounting space 110 may be discharged therethrough. Here, the top inlet 103 may be provided in the base 100 above the mounting space 110, and the filter F preventing the entrance of impurities is provided in the top inlet 103 to remove impurities in the air introduced from above. The bottom outlet 104 may be provided in the base 100 below the mounting space 110, with the size thereof being determined such that the air that has flowed through the second air paths P1-*b* to be efficiently discharged therethrough. Here, the filter F is not provided in the other-bottom outlet 104, since the bottom outlet 104 is not a component through which an external air is introduced, or the filter F may be provided in the bottom outlet 104.

Since the first air paths P1-*a* extending in the direction from one-side inlet 101 to the other-side outlet 102 is provided in the mounting space 110 of the base 100, the air introduced from the front of the air mobility vehicle may be provided to the battery pack 200 disposed inside the mounting space 110. Furthermore, since the second air paths P1-*b* extend in the direction from the top inlet 103 to the bottom outlet 104, the air introduced from above the air mobility vehicle may be provided to the battery pack 200 disposed inside the mounting space 110. Accordingly, cooling air may be provided to the interior of the battery pack 200 in a variety of flight modes and a variety of flight directions, efficiently cooling the batteries 210.

Furthermore, a propeller 120 configured to tilt in the top-bottom direction is provided on one end portion of the base 100, and the mounting space 110 is provided in one end portion of the base 100. When the propeller 120 operates, air circulates through the first air paths P1-*a* or the second air paths P1-*b*, depending on the tilting position of the propeller 120.

Here, the propeller 120 is tiltably disposed on one end portion of the base 100 via a tilting unit. The direction of thrust is determined depending on the tilting angle of the propeller 120. Thus, the mounting space 110 is provided on one end portion of the base 100 such that air is introduced thereto by thrust generated during the operation of the propeller 120. In the cruising mode in which the air mobility vehicle flies forward, the propeller 120 disposed perpendicularly to the horizon generates an air flow in the front-to-rear direction thereof. Thus, external air is introduced to the first air paths P1-*a* of the base 100 and flows through the air circulation paths P2 of the battery pack 200 in the direction from one side to the other side, cooling the batteries 210. Furthermore, in the hovering mode in which the air mobility vehicle flies in the top-bottom direction thereof, the propeller 120 disposed horizontally generates an air flow in the top-to-bottom direction thereof. Thus, external air is introduced to the second air paths P1-*b* of the base 100 and flows through the air circulation paths P2 of the battery pack 200 in the top-to-bottom direction thereof, cooling the batteries 210.

As described above, the propeller 120 are disposed on one end portion of the base 100, and the mounting space 110 is disposed on one end side of the base 100. Accordingly, the batteries 210 inside the battery pack 200 may be cooled using an air flow due to thrust generated during the operation of the propeller 120.

Here, the battery pack 200 may be a plurality of battery packs provided on both side portions of the mounting space 110 to be spaced from each other. Although the battery packs 200 may be disposed in the center portion of the mounting space 110, additional components, such as the tilting unit T, of the propeller 120 may be disposed in the mounting space 110, in addition to the battery packs 200. Thus, the battery packs 200 may be disposed on both side portions of the mounting space 110 and spaced from each other to prevent interference with other components. Furthermore, when the battery packs 200 are disposed on both side portions of the mounting space 110, the introduction of air flowing through the internal surfaces of the mounting space 110 may be facilitated, ensuring the cooling performance of the batteries 210.

The heat transfer panels 220 of the battery pack 200 will be described in detail. As illustrated in FIG. 6, each of the heat transfer panels 220 includes a pair of pads 221 defining therein a plurality of recessed receptacles 222 in which the batteries 210 are accommodated, respectively. The receptacles 222 are spaced from each other by predetermined distances. When the pads of the pair of pads 221 are coupled to each other, the batteries 210 are surrounded by (or received in) the receptacles 222. The heat transfer panels 220 may be made of an aluminum alloy, and are respectively comprised of a pair of pads 221 defining the plurality of receptacles 222 therein in the longitudinal direction thereof, with the batteries 210 being accommodated in the receptacles 222. Portions of the pair of pads 221, except for the receptacles 222, may be jointed to each other via stamping or the like. When the pads 221 are jointed to each other, the batteries 210 accommodated in the receptacles 222 are surrounded by the pads 221 such that the batteries 210 may exchange heat with external air via the heat transfer panels 220.

Here, the batteries 210 are lithium-ion batteries 210, are cylindrically shaped, and are disposed in the top-bottom direction by the pair of pads 221 such that air flowing through the circulation paths P2 may flow in both the front and rear direction and the top-bottom direction thereof. When the batteries 210 are horizontally disposed in the heat transfer panels 220, the air flow in the top-bottom direction is blocked, and the entire packages would be increased to provide the air flow. Thus, the batteries 210 fixed to the heat transfer panels 220 are disposed in the top-bottom direction such that air circulates in both the front and rear direction and the top-bottom direction through the air circulation paths P2 defined by the heat transfer panels 220.

Furthermore, heat transfer pads 223 having high thermal conductivity are provided on the receptacles 222 of the pads 221 of the heat transfer panels 220. The heat transfer pads 223 are made of a high thermal conductivity material. When the pads of the pair of pads 221 are coupled to each other, the heat transfer pads 223 are located between the receptacles 222 and the batteries 210 to be in close contact with the batteries 210 and the heat transfer pads 223. Thus, the thermal conductivity between the air and the batteries 210 is improved via the heat transfer panels 220, ensuring the cooling performance. Furthermore, since the heat transfer pads 223 remove the spaces between the receptacles 222 of the heat transfer panels 220 and the batteries 210, the batteries 210 are securely fixed to improve structural stability and ensure the cooling performance due to high thermal conductivity.

Furthermore, as illustrated in FIG. 6, the plurality of heat transfer panels 220 are spaced from each other in the lateral direction while being staggered in the longitudinal direction such that the receptacles 222 in the heat transfer panels 220 are staggered in a zig-zag pattern. Since the heat transfer panels 220 disposed in the lateral direction in each of the battery packs 200 are disposed to be staggered in the longitudinal direction thereof, the receptacles 222 are staggered in a zig-zag pattern such that the air circulation paths P2 between the heat transfer panels 220 extend in a corrugated and wave-shaped pattern. Accordingly, air flowing through the air circulation paths P2 may efficiently exchange heat with the heat transfer panels 220, ensuring the cooling performance of the batteries 210.

Furthermore, the heat transfer panels 220 may be disposed such that the receptacles 222 of each heat transfer panel 220 are located between the receptacles 222 of an adjacent heat transfer panel 220. Accordingly, the distances between the heat transfer panels 220 may be reduced, reducing an overall size of the battery packs 200 comprised of the batteries 210. Furthermore, since the receptacles 222 of each heat transfer panel 220 are located between the receptacles 222 of an adjacent heat transfer panel 220, the air circulation paths P2 may extend in the corrugated and wave-shaped pattern, ensuring the heat exchange performance between the air flowing through the air circulation paths P2 and the heat transfer panels 220.

The air-cooled battery cooling system for an air mobility vehicle, having the above-described structure for cooling the batteries 210, ensures the cooling performance for the batteries 210 using air flows during the flight of the air mobility vehicle, since the cooling of the batteries 210 is performed using an air flow in the top-bottom direction due to the hovering of the air mobility vehicle and an air flow in the front and rear direction due to the cruising of the air mobility vehicle, the efficient cooling performance for the batteries 210 is ensured in a variety of flight modes. Furthermore, the batteries 210 are securely fixed while being cooled by air flows via the heat transfer pads 223 within the battery packs 200.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An air-cooled battery cooling system for an air mobility vehicle, the air-cooled battery cooling system comprising:
a base including a mounting space extending in a longitudinal direction of the base, and having defined therein an air path through which an external air flows into the mounting space; and
a battery pack mounted inside the mounting space of the base and including a plurality of batteries and a plurality of heat transfer panels fixing the plurality of batteries in the battery pack,
wherein the plurality of heat transfer panels is spaced from each other to define air circulation paths therebetween so that the external air introduced through the air path of the mounting space cools the plurality of batteries while flowing through the air circulation paths,
wherein the air path includes a first air path and a second air path,
wherein the mounting space is equipped at an intersection where the first air path, which penetrates the base in a front-to-back direction, and the second air path, which penetrates the base in a vertical direction, intersect, and
wherein the base is equipped with a propeller that transitions between a state of supplying a generated airflow, which produces lift for the air mobility vehicle, to the mounting space through the first air path, and a state of supplying the generated airflow to the mounting space through the second air path.

2. The air-cooled battery cooling system of claim 1, wherein the plurality of heat transfer panels extends in the longitudinal direction of the base so that the plurality of batteries is disposed and secured in the longitudinal direction, and
wherein the plurality of heat transfer panels is spaced from each other in a lateral direction and a top-bottom direction of the base to define the air circulation paths through which the external air introduced through the first air path and the second air path circulates.

3. The air-cooled battery cooling system of claim 1, wherein the base further includes:
an inlet in a first end portion of the base and an outlet in a second end portion of the base, defining the first air path extending through the mounting space from a first side to a second side of the base; and
a filter mounted in at least one of the inlet and the outlet and configured for removing impurities.

4. The air-cooled battery cooling system of claim 1, wherein the base includes:
a top inlet provided above the mounting space and a bottom outlet provided below the mounting space, defining the second air path extending through the mounting space in a top-to-bottom direction; and
a filter mounted in at least one of the top inlet and the bottom outlet and configured for removing impurities.

5. The air-cooled battery cooling system of claim 1, wherein the battery pack includes a plurality of battery packs disposed on a first side portion and a second side portion of the mounting space to be spaced from each other.

6. The air-cooled battery cooling system of claim 1, wherein each of the heat transfer panels includes a pair of pads defining therein a plurality of recessed receptacles in which the plurality of batteries is accommodated, respectively, the plurality of recessed receptacles being spaced from each other by predetermined distances, so that, when the pads are coupled to each other, the plurality of batteries is surrounded by the plurality of recessed receptacles.

7. The air-cooled battery cooling system of claim 6, wherein each of the heat transfer panels further includes heat transfer pads provided on the plurality of recessed receptacles of the pads, and
wherein when the pads are coupled to each other, the heat transfer pads are located between the plurality of recessed receptacles and the plurality of batteries.

8. The air-cooled battery cooling system of claim 6, wherein the plurality of heat transfer panels is spaced from each other in a lateral direction of the base while being staggered in the longitudinal direction so that the plurality of recessed receptacles in the plurality of heat transfer panels is staggered in a zig-zag pattern.

9. The air-cooled battery cooling system of claim 8, wherein the recessed receptacles of each of the heat transfer panels are located between recessed receptacles of an adjacent one of the heat transfer panels.

10. The air-cooled battery cooling system of claim 6, wherein the plurality of batteries is in a form of cylinder and is disposed in the top-bottom direction of the base by the pair of pads.

* * * * *